(12) United States Patent
Bond

(10) Patent No.: US 7,338,241 B2
(45) Date of Patent: Mar. 4, 2008

(54) FASTENER RECEPTACLE

(75) Inventor: Derrin John Bond, Haslemere (GB)

(73) Assignee: Southco, UK Ltd., Worcester, Worcestershire (GB)

( * ) Notice: Subject to any disclaimer, the term of this patent is extended or adjusted under 35 U.S.C. 154(b) by 172 days.

(21) Appl. No.: 11/074,162

(22) Filed: Mar. 7, 2005

(65) Prior Publication Data

US 2006/0198715 A1    Sep. 7, 2006

(51) Int. Cl.
*F16B 37/02*    (2006.01)
*F16B 21/00*    (2006.01)

(52) U.S. Cl. .................. 411/173; 411/175; 411/185; 411/186; 411/172; 411/85; 411/349; 411/553

(58) Field of Classification Search ........ 411/173–175, 411/183–186, 349, 549, 552, 553, 84, 85, 411/181, 172
See application file for complete search history.

(56) References Cited

U.S. PATENT DOCUMENTS

| | | | |
|---|---|---|---|
| 1,912,100 A * | 5/1933 | Rosenberg | 411/173 |
| 2,376,167 A * | 5/1945 | Mitchell | 411/173 |
| 2,560,961 A * | 7/1951 | Knohl | 411/173 |
| 2,667,200 A * | 1/1954 | Bedford, Jr. | 411/173 |
| 2,707,013 A * | 4/1955 | Flora et al. | 411/173 |
| 3,493,025 A * | 2/1970 | Van Huffel et al. | 411/103 |
| 3,921,261 A * | 11/1975 | Fisher | 24/580.1 |
| 5,199,836 A * | 4/1993 | Gogarty | 411/84 |
| 5,368,427 A * | 11/1994 | Pfaffinger | 411/553 |
| 5,468,104 A * | 11/1995 | Reid et al. | 411/113 |
| 5,820,322 A * | 10/1998 | Hermann et al. | 411/85 |
| 6,474,917 B2 * | 11/2002 | Gauron | 411/112 |
| 6,568,893 B2 * | 5/2003 | LeVey et al. | 411/349 |
| 6,733,221 B2 * | 5/2004 | Linger | 411/84 |
| 2002/0071735 A1* | 6/2002 | Dinh et al. | 411/85 |
| 2003/0091407 A1* | 5/2003 | Linger | 411/84 |
| 2005/0079034 A1* | 4/2005 | Maas | 411/553 |

FOREIGN PATENT DOCUMENTS

GB    1085387    9/1967

* cited by examiner

*Primary Examiner*—Katherine Mitchell
(74) *Attorney, Agent, or Firm*—Paul & Paul

(57) ABSTRACT

A receptacle for a fastener which is inserted into a receptacle receiving member. The receptacle is insertable and rotatable in a hole in the receptacle receiving member and includes at least one arm extending from a fastener receiving member. The arm is arranged to engage with a first side of the receptacle receiving member on insertion of the fastener receiving member into the receptacle receiving member.

8 Claims, 3 Drawing Sheets

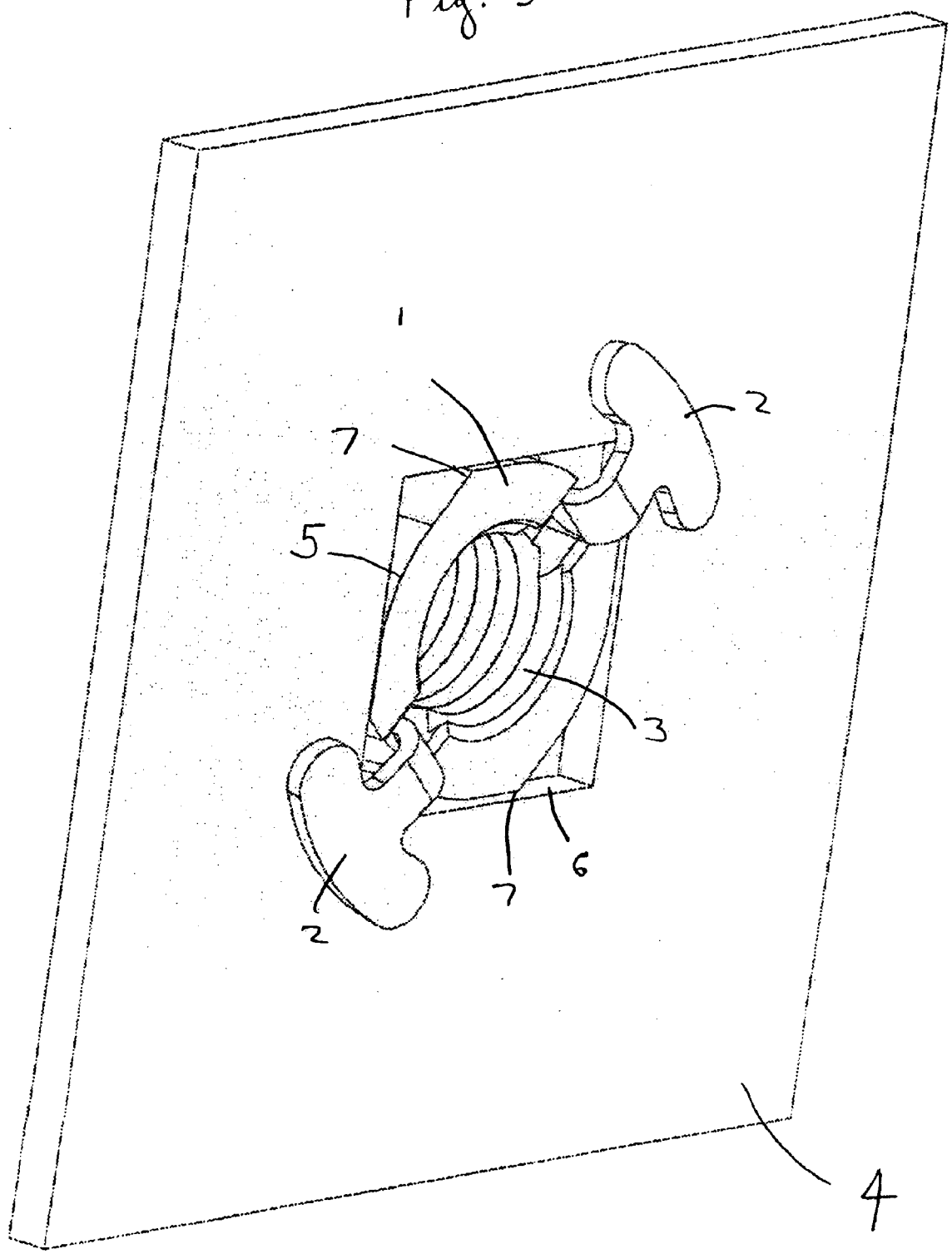

FASTENER RECEPTACLE

BACKGROUND OF THE INVENTION

The present invention relates to a front mountable receptacle for a fastener.

There are many types of fasteners and receptacles currently known in the art. However, in some situations where fastening is required, only limited access is possible which means that installing fastening means is problematic. In addition, in many situations standard-sized openings are provided in panels yet it is difficult to provide fastening components which are readily received into such standard-sized openings.

Further, in many of these situations where fastening is required but access is limited, relatively high and torque and clamp loads are needed. This is the case, for example, in electronics enclosures where rear access is not possible in some sections.

There therefore exists a need for compact means to enable strong fastening which can be installed even when access is restricted.

Although many latch assemblies are known in the prior art, none are seen to teach or suggest the features of the present invention or to achieve the advantages of the present invention.

SUMMARY OF THE INVENTION

According to the present invention there is provided a receptacle for a fastener for insertion, in use, into a receptacle receiving component, the receptacle comprising a fastener receiving member insertable, in use, into a hole in the receptacle receiving member; and at least one arm extending from the fastener receiving member, the arm arranged to engage, in use, with a first side of the receptacle receiving component on insertion of the fastener receiving member into the receptacle receiving component wherein, when the arm enters into engagement with the first side of the receptacle receiving component, the receptacle is rotatable to a position where a portion of the fastener receiving member engages with a second side of the receptacle receiving component to retain the receptacle in the receptacle receiving member.

The present invention provides a fastener receptacle which can be inserted into a standard-sized opening to enable fastening to be provided by a fastener such as a bolt of a different standard size. It also provides a receptacle which can be inserted and retained in position without the need to access both sides of the receptacle receiving component. Furthermore, because the at least one arm can be provided with a certain amount of flexibility the receptacle can be inserted into the receiving component of different thicknesses, reducing the tolerance requirements on any receiving component into which it is to be inserted and enabling it to be employed with a variety of different receiving components.

BRIEF DESCRIPTION OF THE DRAWINGS

The present invention will be now described with reference to the accompanying drawings in which:

FIG. 3 shows the receptacle according to FIG. 1 after being fully inserted into the hole and rotated by about 45 degrees.

DETAILED DESCRIPTION OF THE INVENTION

Figure 1:
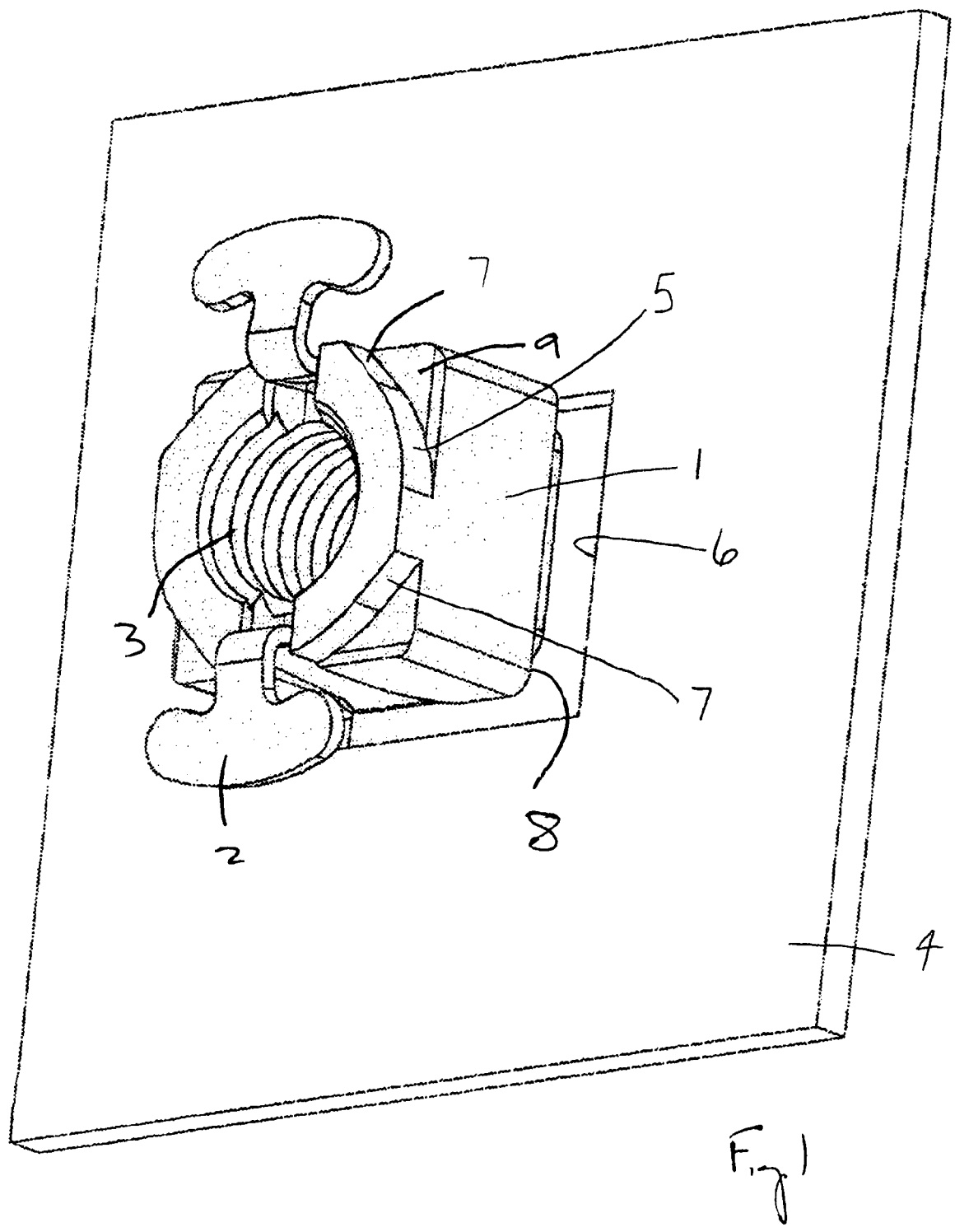
FIG. 1 shows a receptacle according to the present invention ready to be inserted into a hole in a receptacle receiving component.

Referring to FIG. 1, a receptacle according to the present invention comprises a nut 1, and a frame connected to two arms 2 extending from the nut 1 at a first end of the nut 1 for engagement with a panel 4. The nut 1 has an internal screw thread 3 for receiving an externally screw threaded bolt (not shown).

At the first end of the nut 1 the perimeter 5 of the cross section of the nut 1 perpendicular to the insertion direction is substantially circular with a diameter slightly smaller than the width of the hole 6, at its smallest point, in the panel 4 in which the receptacle is to be installed. There are protrusions 7 from the circular perimeter 5. The protrusions are shaped such that, in combination with the circular perimeter 5, they allow the nut to be rotated when inserted through, in this example, approximately 45 degrees, but then prevent the receptacle from being rotated further.

The remainder of the nut 1 is shaped appropriately so as to fit through the hole 6. The shape of the nut 1 is also such that once the nut 1 is inserted into the panel 4, the nut 1 is constrained to move substantially only in the plane perpendicular to the panel 4 until the arms 2 reach the first side of panel 4. In the example in FIG. 1 the hole 6 and the perimeter 8 of the cross section in the insertion direction of the remainder of the nut 1 are both substantially square shaped, although other hole and nut shapes are possible.

The arms 2 extend away from the nut 1 approximately in the plane of the square cross section of the nut 1. The arms 2 extend such that the arms 2 are engageable with the first side of panel 4 around the hole 6 when the receptacle is in the installed position as seen in FIG. 3. The arms 2 are dimensioned and configured and in this instance curved so that there is tension in the arms 2 when engaged with the panel 4 and the receptacle is rotated into position and the arms 2 exert a retaining force on the first side panel 4. The area of the arms 2 can increase at the distal ends to increase the contact area with the panel 4, with the arms 2 in this example being "T" shaped. Because of the flexibility of the arms 2 the receptacle can be inserted into panels of varying thickness, and as such, improves the overall tolerances in the finished component.

The process of installation of the receptacle will now be described with reference to FIGS. 1 to 3.

Figure 2:
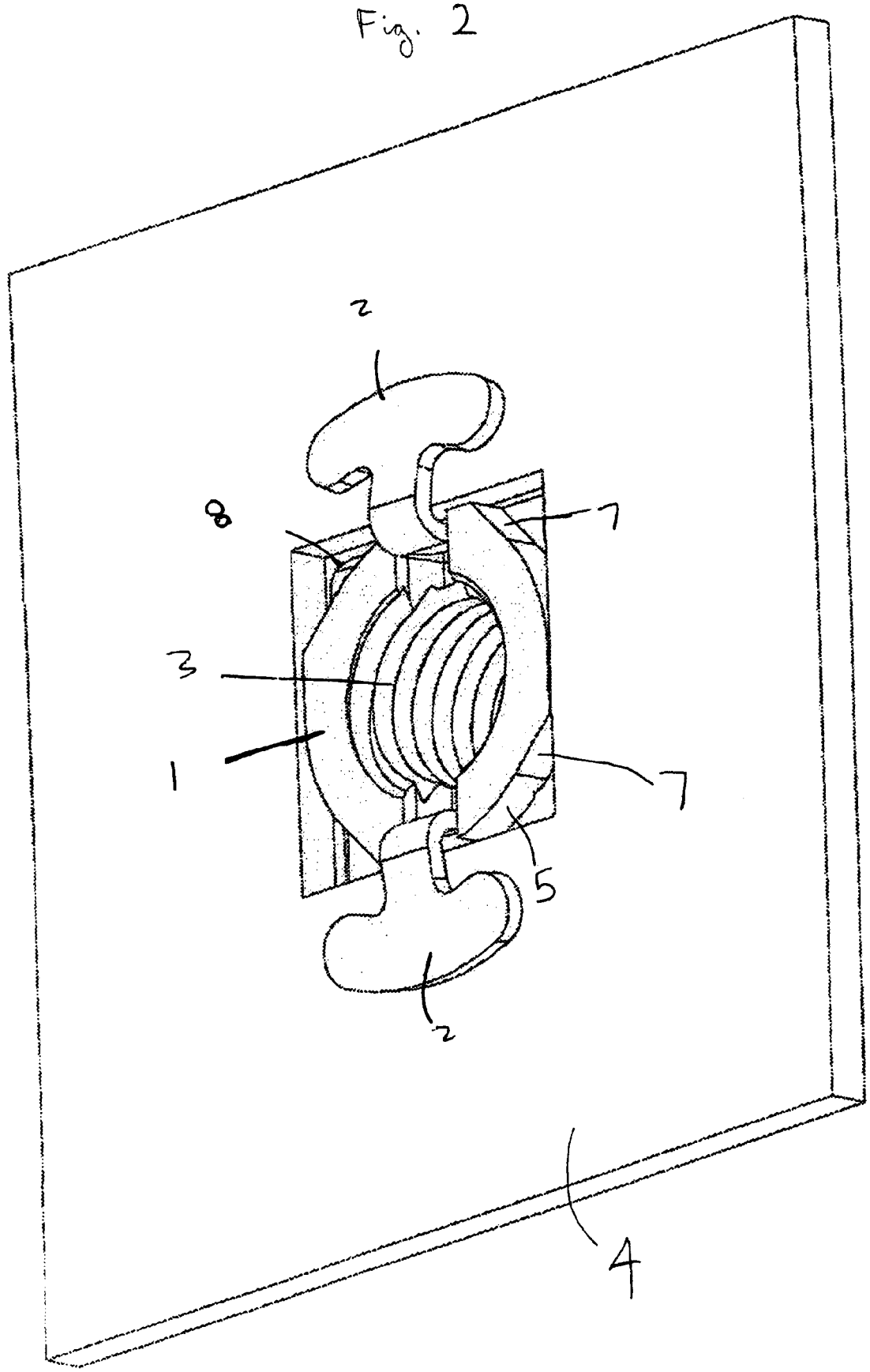
FIG. 2 shows the receptacle according to FIG. 1 when inserted part of the way into the hole.

When the receptacle is to be installed into a hole 6 in a panel 4, the receptacle is initially lined up with the hole 6 as seen in FIG. 1 and then pushed through the hole 6 as seen in FIG. 2. The shape of the nut 1 relative to the hole 6 means that once the nut 1 has entered the hole, it is not possible to rotate the nut 1 within the hole 6.

The nut 1 is pushed through the hole 6 until the arms 2 engage with first side of the panel 4. At this point the substantially circular perimeter 5 part of the nut 1 is level with the hole 6 and the nut 1 therefore becomes rotatable within the hole 6.

The nut 1 is then rotated approximately 45 degrees in this example, to a position shown in FIG. 3. It will be clear to a person skilled in the art that other angles of rotation may be necessary or desirable, depending on the shape of the hole and nut. The protrusions 7 prevent the nut 1 from being rotated beyond its desired position. Upon rotation of the nut 1, the surfaces 9 at the end of the section of the nut with a square perimeter 8 come into engagement with the second side of panel 4. The receptacle therefore becomes retained in the panel 4 with the panel 4 being clamped between nut surfaces 9 and the clamping force provided by arms 2.

A bolt can be then be screwed into the receptacle from the same side of the panel 4 from which the receptacle was installed.

The receptacle according to the present invention is compact and can be front-installed through a smaller hole than is possible for conventional receptacles. The tension in the arms 2 ensures that the receptacle is held securely in the panel 4 enabling the required high torque and clamp loads when a fastening is in place.

It will be apparent to those skilled in the art that various modifications can be made to the latch of the present invention without departing from the scope and spirit of the invention, and it is intended that the present invention cover modifications and variations of the latch which are within the scope of the appended claims and their equivalents.

The invention claimed is:

1. A receptacle for a fastener for insertion into a receptacle receiving member, the receptacle comprising:
    a fastener receiving member insertable into a hole in the receptacle receiving member;
    at least one arm extending from the fastener receiving member, said at least one arm arranged to engage with a first side of the receptacle receiving member upon insertion of said fastener receiving member into the receptacle receiving member;
    wherein said fastener receiving member includes a first section proximate said at least one arm, said first section having at least one stop member to limit rotation of the receptacle and a cross section perpendicular to the insertion direction of the receptacle, said cross section of said first section having a perimeter that is circular at least in part to allow rotation of the receptacle subsequent to being inserted into the hole; and
    wherein when said at least one arm engages the first side of the receptacle receiving member, the receptacle is rotatable to a position where a portion of the fastener receiving member engages with a second side of the receptacle receiving member to retain the receptacle in the receptacle receiving member and wherein at least a portion of said perimeter that is circular at least in part resides within and is generally even with the hole in the receptacle receiving member when the receptacle is retained in the receptacle receiving member.

2. A receptacle according to claim 1, wherein said at least one arm is curved to provide a retaining force to retain the receptacle in the receptacle receiving member.

3. A receptacle according to claim 2, wherein the fastener receiving member has a second section having a substantially square cross-sectional shape, said second section forming said portion of the fastener receiving member that engages with the second side of the receptacle receiving member.

4. A receptacle according to claim 1, wherein the fastener receiving member has a second section having a substantially square cross-sectional shape, said second section forming said portion of the fastener receiving member that engages with the second side of the receptacle receiving member.

5. A receptacle according to claim 1, wherein the receptacle comprises two arms extending from said fastener receiving member.

6. A receptacle according to claim 5, wherein said two arms are curved to provide retaining force to retain the receptacle in the receptacle receiving member.

7. A receptacle according to claim 6, wherein said fastener receiving member has a second section having a substantially square cross-sectional shape, said second section forming said portion of the fastener receiving member that engages with the second side of the receptacle receiving member.

8. A receptacle according to claim 5, wherein said fastener receiving member has a second section having a substantially square cross-sectional shape, said second section forming said portion of the fastener receiving member that engages with the second side of the receptacle receiving member.

* * * * *